United States Patent
Schmidt et al.

(10) Patent No.: US 11,760,521 B2
(45) Date of Patent: Sep. 19, 2023

(54) METHOD AND DEVICE FOR FILLING A CONTAINER WITH PRODUCTS

(71) Applicant: Focke & Co. (GmbH & Co. KG), Verden (DE)

(72) Inventors: Dennis Schmidt, Westoverledingen (DE); Andreas Prahm, Barssel (DE); Andreas Neufeld, Ostrhauderfehn (DE); Frank Sachs, Saterland (DE)

(73) Assignee: Focke & Co. (GmbH & Co. KG), Verden (DE)

( * ) Notice: Subject to any disclaimer, the term of this patent is extended or adjusted under 35 U.S.C. 154(b) by 291 days.

(21) Appl. No.: 17/287,614

(22) PCT Filed: Oct. 23, 2019

(86) PCT No.: PCT/EP2019/078938
§ 371 (c)(1),
(2) Date: Apr. 22, 2021

(87) PCT Pub. No.: WO2020/084011
PCT Pub. Date: Apr. 30, 2020

(65) Prior Publication Data
US 2021/0394942 A1    Dec. 23, 2021

(30) Foreign Application Priority Data
Oct. 26, 2018   (DE) .......................... 102018008476.1

(51) Int. Cl.
*B65B 35/54*   (2006.01)
*B65B 5/06*    (2006.01)
(Continued)

(52) U.S. Cl.
CPC .............. *B65B 35/54* (2013.01); *B65B 5/061* (2013.01); *B65B 5/106* (2013.01); *B65G 47/082* (2013.01); *B65G 47/57* (2013.01); *B65G 47/681* (2013.01)

(58) Field of Classification Search
CPC ........... B65B 5/06; B65B 5/061; B65B 5/105; B65B 5/106; B65B 35/44; B65B 5/08;
(Continued)

(56) References Cited

U.S. PATENT DOCUMENTS 4,862,677 A * 9/1989 Roberts .................. B65B 5/106
                                                    53/527
5,002,449 A    3/1991 Kita
(Continued)

FOREIGN PATENT DOCUMENTS

DE    1786161 A1    1/1972
DE    3106300 A1    9/1982
(Continued)

OTHER PUBLICATIONS

Deutsches Patent—Und Markenamt (German Patent and Trademark Office), Recherchebericht (search in a related application), Jun. 7, 2019.
(Continued)

*Primary Examiner* — Anna K Kinsaul
*Assistant Examiner* — Veronica Martin
(74) *Attorney, Agent, or Firm* — Laurence P. Colton; SMITH TEMPEL BLAHA LLC

(57) ABSTRACT

A method and a device for filling containers with products, in which the products are successively conveyed horizontally to a filling installation in which the products, while
(Continued)

being combined to form individual product groups, are grouped, and an offered-up container, which is conveyed horizontally to the filling installation, is filled in a single track with one or a plurality of product groups, wherein the filled containers subsequently are in particular horizontally transported away. The method includes conveying the products in multiple tracks to the filling installation, grouping the products to form product groups, feeding the product groups in multiple tracks to a common revolving vertical conveyor of the filling installation, conveying the product groups to an ejection position from which the product groups are conveyed onward in a single track to an offered-up container, and filling the offered-up container with at least one of the product groups.

22 Claims, 8 Drawing Sheets

(51) Int. Cl.
| | | |
|---|---|---|
| *B65B 5/10* | (2006.01) | |
| *B65G 47/08* | (2006.01) | |
| *B65G 47/57* | (2006.01) | |
| *B65G 47/68* | (2006.01) | |

(58) Field of Classification Search
CPC ...... B65B 35/54; B65G 47/082; B65G 47/57; B65G 47/681
See application file for complete search history.

(56) References Cited

U.S. PATENT DOCUMENTS

| 5,996,310 | A | * | 12/1999 | Bailey | ................ | B65B 43/185 |
|---|---|---|---|---|---|---|
| | | | | | | 53/228 |
| 10,669,098 | B1 | * | 6/2020 | Terzini | ................ | B65B 35/10 |

FOREIGN PATENT DOCUMENTS

| DE | 9105207 | U1 | 7/1991 |
|---|---|---|---|
| DE | 10102926 | A1 | 7/2002 |
| DE | 202014000749 | U1 | 6/2014 |
| DE | 102016014333 | A1 | 6/2018 |
| JP | H08143111 | A | 6/1996 |
| WO | 2008034488 | A1 | 3/2008 |

OTHER PUBLICATIONS

WIPO, International Search Report (in priority application), dated Dec. 20, 2019.

* cited by examiner

METHOD AND DEVICE FOR FILLING A CONTAINER WITH PRODUCTS

CROSS REFERENCE TO RELATED APPLICATIONS

This application is the US National Phase of and claims the benefit of and priority on International Application No. PCT/EP2019/078938 having a filing date of 23 Oct. 2019, which claims priority on and the benefit of German Patent Application No. 10 2018 008 476.1 having a filing date of 26 Oct. 2018.

BACKGROUND OF THE INVENTION

Technical Field

The invention relates to a method for filling containers, in particular cartons, with products such as, for instance, packs, in which the products are successively conveyed horizontally to a filling installation in which the products, while being combined so as to form individual product groups, thereafter are grouped, and an offered-up container, which is in particular conveyed horizontally to the filling installation, is in each case filled in a single track with one or a plurality of product groups, wherein the filled containers subsequently are in particular horizontally transported away. The invention furthermore relates to a corresponding device for filling such containers, having a horizontal conveyor for horizontally feeding the products to a filling installation of the device in which the products, while being combined so as to form individual product groups, thereafter are grouped and filled into an offered-up container.

Prior Art

A multiplicity of methods and devices of this type are known, inter alia from DE 10 2016 014 333 A1. The feeding of the individual products to the filling installation by means of infeed conveyors, the grouping of the products, the feeding of the containers to the filling installation as well as the outward conveying of the filled containers from the filling installation by means of outfeed conveyors, as disclosed in this publication, takes place predominantly in horizontal planes, which requires space. In order for this space requirement to be limited, it is inter alia provided in DE 10 2016 014 333 A1 that the filled containers are moved in a vertical plane, from the top to the bottom, in the direction of the outfeed conveyor.

However, as has been established by the applicant, the construction of DE 10 2016 014 333 A1 has limits in terms of the achievable filling rate, said limits inter alia being caused by the individual products being fed to the filling installation in a single track, as shown therein.

BRIEF SUMMARY OF THE INVENTION

Proceeding therefrom, it is an object of the present invention to refine the method and the device of the type mentioned at the outset.

This object is achieved by a method for filling containers, in particular cartons, with products, in particular packs, in which the products are successively conveyed horizontally to a filling installation in which the products, while being combined so as to form individual product groups, thereafter are grouped, and an offered-up container, which is in particular conveyed horizontally to the filling installation, is in each case filled in a single track with one or a plurality of product groups, wherein the filled containers subsequently are in particular horizontally transported away, characterized by the following measures:

a) the products are conveyed in multiple tracks to the filling installation, specifically along a plurality of conveying tracks which are disposed on top of one another;

b) the products conveyed along the conveying tracks to the filling installation are grouped by the filling installation in multiple tracks so as to form product groups, in particular by grouping conveyors of the filling installation that are in each case assigned to the conveying tracks and disposed on top of one another, preferably by compartmentalized conveyors that are disposed on top of one another;

c) the product groups thereafter are successively fed in multiple tracks along infeed tracks that are disposed on top of one another to a common revolving vertical conveyor of the filling installation, said vertical conveyor having a plurality of receptacles which for in each case (at least) one product group of each infeed track are disposed on top of one another;

d) the vertical conveyor conveys in each case the product groups received by said vertical conveyor from further below to further above to an ejection position from which the product groups thereafter are conveyed onward in a single track in the direction of a respective offered-up container;

e) the offered-up container is filled with at least one of the product groups, and by a device having for filling containers, in particular cartons, with products, in particular packs, in particular for carrying out the method as taught herein, having a horizontal conveyor for horizontally feeding the products to a filling installation of the device in which the products, while being combined so as to form individual product groups, thereafter are grouped and filled into an offered-up container, characterized in that the filling installation has a multi-track grouping apparatus having a plurality of grouping conveyors which are disposed on top of one another, in particular in each case in a horizontal plane, and by way of which the products are in each case grouped so as to form product groups; in that the horizontal conveyor is configured as a multi-track horizontal conveyor apparatus which is disposed upstream of the grouping apparatus and has a plurality of individual conveyors which are disposed on top of one another and which feed the products in each case horizontally to in each case one of the grouping conveyors assigned to the respective individual conveyor; and in that the filling installation downstream of the grouping apparatus has a single-track vertical conveyor which has a plurality of receptacles which for in each case (at least) one product group are disposed on top of one another, the product groups that have been grouped by the grouping apparatus being able to be fed in multiple tracks along a plurality of infeed tracks which are disposed on top of one another to the receptacles of said vertical conveyor.

Accordingly, the method according to the invention is characterized by the following features:

a) the products such as, for instance, bags (filled, for example, with chips, tobacco or other filling products) are conveyed in multiple tracks to the filling installation, specifically along a plurality of conveying tracks which are disposed on top of one another;

b) the products conveyed along the conveying tracks to the filling installation are grouped by the filling installation in multiple tracks so as to form product groups, in particular by grouping conveyors of the filling installation that are in each case assigned to the conveying tracks and disposed on top of one another, in particular in a common (vertical) plane, preferably by compartmentalized conveyors that are correspondingly disposed on top of one another;

c) the product groups thereafter are successively fed in multiple tracks along infeed tracks that are disposed on top of one another to a common revolving vertical conveyor of the filling installation, said vertical conveyor having a plurality of (in particular equidistantly spaced apart) receptacles which for in each case (at least) one product group of each infeed track are disposed on top of one another, in particular in a common (vertical) plane;

d) the vertical conveyor conveys in each case the product groups received by said vertical conveyor from further below to further above to an ejection position (in particular one and the same ejection position, or which is in particular identical for all receptacles, respectively), from which the product groups thereafter are conveyed onward in a single track in the direction of a respective offered-up container; and e) the offered-up container is filled with at least one of the product groups.

According to the invention, it is achieved on account of the provided multi-track nature of the product infeed to the filling installation that the maximum possible infeed of products to the filling installation can be multiplied (doubled in the case of dual tracks). The vertical conveyor of the filling installation according to the invention in this instance ensures that the containers which are in each case offered up can nevertheless continue to be filled with the product groups in a single track. Said vertical conveyor thus serves as a converter which acts between a multi-track product infeed and a single-track further treatment of the product.

In as far as mention is made of "horizontal" or "vertical" with reference to planes or elements, etc., in the context of the application, this includes slight inclinations, in particular up to 20°, of the respective elements or planes in relation to the horizontal or the vertical.

In as far as conveying tracks or elements, etc., which are described in the application and disposed on top of one another, said conveying tracks or elements, unless otherwise specifically mentioned, can of course be disposed on top of one another in a common (vertical) plane as well as on top of one another so as to be laterally offset, thus in different (vertical) planes.

The device according to the invention will typically be operated in a cycled manner.

In one preferred refinement of the invention, in a first operating cycle of the device a first set of receptacles of the vertical conveyor can in each case be moved simultaneously further upward to insertion positions which are assigned to the infeed tracks and in each case disposed so as to be level with the infeed tracks (one insertion position assigned to each infeed track), wherein each receptacle in the respective insertion position thereof is in each case offered up for receiving one product group of the assigned infeed track, or for receiving a product group which is fed along the infeed track assigned to the insertion position, respectively. In the immediately following second operating cycle at least one product group of at least one infeed track can be inserted into the respective offered-up assigned receptacle, wherein in the next, third operating cycle a second set of receptacles is in each case moved simultaneously further upward to the respective insertion positions.

Should the filling installation comprise (only) two infeed tracks, specifically a lower and an upper infeed track, the lower infeed track can preferably be assigned a lower insertion position which is in each case disposed so as to be level with said lower infeed track, and the upper infeed track can be assigned an upper insertion position which is disposed so as to be level with said upper infeed track, wherein in each case a receptacle is moved successively in a cycled manner into each insertion position. Each of the receptacles situated in the respective insertion position herein can be in each case offered up for receiving a product group of the assigned infeed track, but it may be provided that it applies to each of these insertion positions that one product group is in each case inserted only into every other of the receptacles successively moved to said insertion position, or offered up at said insertion position, respectively.

In other words, should the filling installation comprise (only) two infeed tracks as mentioned above, specifically a lower and an upper infeed track, and should the lower infeed track be assigned a lower insertion position which is disposed so as to be in each case level with said lower infeed track, and the upper infeed track is assigned an upper insertion position which is disposed so as to be level with said upper infeed track, it may be provided that in a first operating cycle a or the first set of receptacles of the vertical conveyor is in each case moved simultaneously further upward to the insertion positions which are assigned to the two infeed tracks, wherein each of these receptacles in the respective insertion position thereof is in each case offered up for receiving one product group of the assigned infeed track; and wherein one product group is in each case successively inserted in a cycled and alternating manner into a receptacle situated in the one insertion position, while no product group is simultaneously inserted into a receptacle situated in the other insertion position.

It can furthermore be provided that in the next, second operating cycle a product group is inserted into only one of the two receptacles offered up in the respective insertion positions, specifically into the receptacle offered up in the upper insertion position, while the receptacle offered up in the other insertion position, specifically the lower insertion position, remains empty.

It can be provided herein that in the immediately following third operating cycle the receptacle which in the first operating cycle has been moved to the lower insertion position is moved to an intermediate position situated between the lower and the upper insertion position (receiving of a product group being impossible in said intermediate position), a receptacle which in the first operating cycle has been moved to the intermediate position is moved to the upper insertion position, and the receptacle which in the first operating cycle has been moved to a position below the lower insertion position is moved to the lower insertion position, wherein in the immediately following forth operating cycle a product group is inserted into the receptacle situated in the lower insertion position, while no product group is simultaneously inserted into a receptacle situated in the other insertion position.

It can furthermore be provided herein that in the immediately following fifth operating cycle the receptacle which in the third operating cycle has been moved to the intermediate position is moved to the upper insertion position, the receptacle which in the third operating cycle has been moved to the lower position is moved to the intermediate position, and a receptacle which in the third operating cycle has been moved to a position below the lower insertion position is moved to the lower insertion position, wherein in the sixth operating cycle a product group is inserted into the receptacle situated in the upper insertion position, while the receptacle situated at the lower insertion position remains empty.

Accordingly, in each operating cycle (as defined in the above manner) one receptacle for one product group is preferably offered up at each insertion position, wherein in terms of the respective insertion position only one product group is in each case in each third operating cycle inserted into the respective receptacle offered up there.

In as far as the later conveying of the product groups from the respective receptacles of the vertical conveyor is concerned, the receptacles are preferably successively moved in a cycled manner to the ejection position, wherein that product group that is just now situated in the receptacle situated at the ejection position by means of a slide is ejected from the receptacle in a preferably linear or rectilinear manner, respectively, and along a horizontal conveying plane is inserted into the offered-up container.

According to a further particularity, the vertical conveyor of the filling installation possesses two separate groups of sliders which are in each case guided in a revolving manner, in particular along a (closed) oval movement track in a common upright plane and herein in each case in portions along parallel upright track portions, wherein two respective opposite sliders of the two slider groups during a simultaneous upward movement are in each case moved along the parallel track portions in a synchronized manner such that said two opposite sliders herein lie in a common (moving), substantially horizontal plane, or are mutually aligned, respectively, and conjointly form in each case one of the receptacles of the vertical conveyor.

The sliders, or each of the slides, respectively, of the one slider group herein preferably form in each case with one assigned slider of the other slider group one pair for forming the respective receptacles, wherein the sliders possess in each case one slider platform which is in particular mounted so as to be movable on a carriage of the slider, this carriage being guided along the movement track, the slider platform at each slider of each pair of sliders, in each case before the sliders of the pair are moved to the lowest insertion position, is moved in particular in a synchronized manner relative to a stationary part of the respective slider, from a retracted position in which the respective slider transversely to the movement track thereof is shorter, to a deployed position in which the slider transversely to the movement track thereof is longer, and in which free ends of the two platforms of the mutually aligned sliders of the pair of sliders that are directed toward one another are directly opposite or adjacent to one another, respectively, in particular in a seamless or substantially seamless manner, in a horizontal plane, and in this position are in each case conjointly moved in an upward movement from the bottom to the top.

In a further configuration of this concept, the platforms of the sliders of the pair of sliders can in each case be moved from the deployed position to the retracted position once the respective group of packs situated in the receptacle formed by the sliders, in the ejection position of the receptacle has been conveyed out of the latter in the direction of the container. Thereafter, the sliders of the pair of sliders in a downward movement thereof that follows the upward movement thereof are in each case moved downward with the platform retracted.

In a further specific implementation of the measures according to the invention, the packs can in each case be successively inserted by the conveying tracks that are disposed on top of one another into individual compartments of the respectively assigned grouping conveyors that are configured as compartmentalized conveyors, thereafter in groups are conveyed by the grouping conveyors onward transversely to these conveying tracks, and thereafter from the compartments inserted in each case in groups, transversely to the conveying direction of the grouping conveyors, along the infeed tracks into the receptacles of the vertical conveyor which are in each case situated at assigned insertion positions.

A device according to the invention for filling containers, in particular a device suitable for carrying out the above method, comprises a horizontal conveyor for horizontally feeding the products to the filling installation of the device in which the products, while being combined so as to form individual product groups, thereafter are grouped and filled into the offered-up container, wherein the filling installation accordingly possesses a multi-track grouping apparatus having a plurality of grouping conveyors which are disposed on top of one another, in particular in each case in a horizontal plane, and by way of which the products are in each case grouped so as to form product groups, wherein the horizontal conveyor is configured as a multi-track horizontal conveyor apparatus which is disposed upstream of the grouping apparatus and has a plurality of individual conveyors which are disposed on top of one another and which feed the products in each case horizontally to in each case one of the grouping conveyors assigned to the respective individual conveyor, and wherein the filling installation downstream of the grouping apparatus has a single-track vertical conveyor which has a plurality of receptacles which for in each case (at least) one product group are disposed on top of one another, the product groups that have been grouped by the grouping apparatus being able to be fed in multiple tracks along a plurality of infeed tracks which are disposed on top of one another to the receptacles of said vertical conveyor.

The vertical conveyor herein preferably has two separate sub-conveyors having in each case groups of sliders which are in each case guided in a revolving manner along an in particular oval movement track in a common upright plane and herein in each case in portions along parallel upright track portions, wherein during a simultaneous upward movement opposite sliders of the two slider groups of the sub-conveyors form in each case one pair for forming one of the receptacles of the vertical conveyor.

Respectively two sliders herein can in each case preferably be moved in a synchronized manner along the parallel track portions such that said two sliders herein are mutually aligned in a (moving) horizontal plane and conjointly form in each case one of the receptacles of the vertical conveyor.

The extent of the sliders transversely to the movement track thereof herein is preferably variable, in particular by the slider platform which is able to be retracted or deployed, respectively, in a telescopic manner relative to the stationary part of the slider and is in particular mounted so as to be displaceable on the stationary part.

BRIEF DESCRIPTION OF THE DRAWINGS

Further features of the invention are derived from the appended patent claims, the description hereunder of a preferred exemplary embodiment of the invention as well as from the appended drawings in which:

DETAILED DESCRIPTION OF PREFERRED EMBODIMENTS

Figure 1:
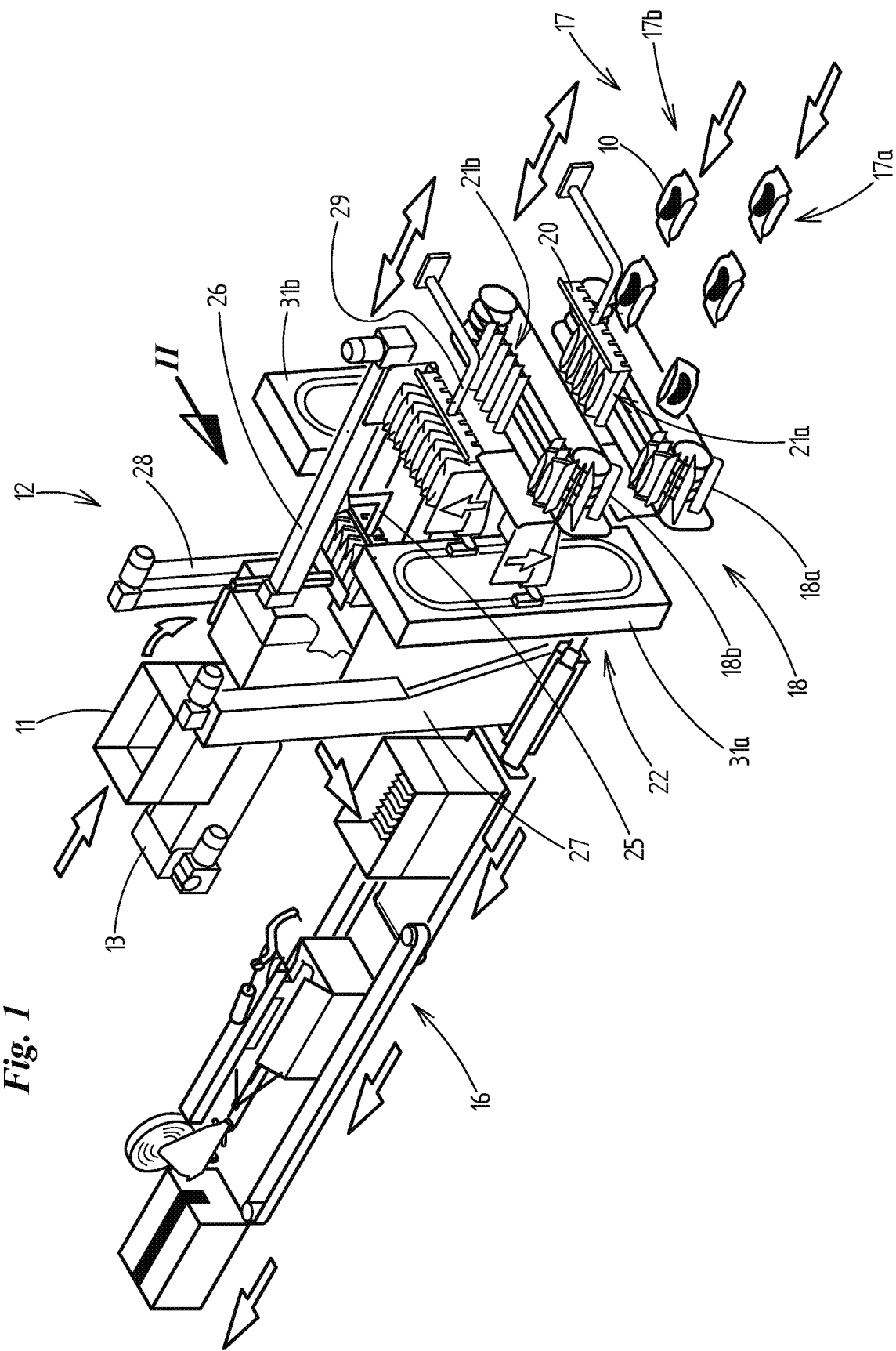
FIG. 1 shows a device according to the invention for filling containers with products in a schematic oblique view.

The exemplary embodiment shown in the figures relates to the filling of packs, in particular bags, in cartons. Since the invention is however not limited only to packs, the general term product 10 is used hereunder. Accordingly, reference is also generally made to containers 11 instead of cartons.

The containers 11 are fed along a (horizontal) infeed conveyor 13 to a filing installation 12. The containers 11 are filled with products 10 in the region of the filling installation 12.

Transporting the containers 11 on the infeed conveyor 13 takes place when empty or not filled, respectively. In the present exemplary embodiment, the containers 11 are transported up right on the infeed conveyor 13, specifically having an open upper side by way of which filling takes place.

In the filling installation 12 the containers 11 are acquired by grippers 14 which are in each case movable up and down in the upright direction along a dedicated linear axle 27, 28. Moreover, the grippers 14 are mounted so as to be pivotable or rotatable, respectively.

Once a container 11 has been acquired by a gripper 14, the container 11 is initially rotated or pivoted, respectively, about approximately 90° so that the open side of the container 11 points toward the side in order for the container 11 to be correspondingly filled. After filling, the filled container 11 by way of the grippers 14 is moved downward along the linear axles 26, 27, rotated or pivoted back, respectively, and set down. The filled container 11 thereafter is transported away and closed on an outfeed conveyor 16.

In terms of further details, reference is made to DE 10 2016 014 333 A1, the content of the latter hereby being incorporated in the present application.

The products 10 by means of a horizontal conveyor apparatus 17 are fed in multiple tracks to the filling installation 12. For this purpose, the horizontal conveyor apparatus 17 possesses a plurality of, presently two, individual conveyors 17a, 17b which are disposed on top of one another. Said individual conveyors 17a, 17b successively convey the products 10 so as to be mutually spaced apart to a grouping apparatus 18 having a plurality of, specifically presently two, grouping conveyors 18a, 18b which are disposed on top of one another.

The individual conveyors 17a, 17b are presently continuous belt conveyors.

The grouping conveyors 18a, 18b are compartmentalized conveyors having individual compartments 19 into which the products 10 presently are in each case individually inserted.

The individual conveyors 17a, 17b are in each case assigned to the grouping conveyors 18a and 18b, respectively.

This presently takes place in such a manner that the conveying track of the individual conveyor 17a terminates so as to be level with the height of the grouping conveyor 18a such that the respective product which is situated at the very front on the individual conveyor 17a by means of a slide 20 can be inserted into an offered-up compartment 19 of the grouping conveyor 18a.

In an analogous manner, the conveying track of the individual conveyor 17b terminates so as to be level with the height of the conveying track of the grouping conveyor 18b and by means of a further slide 20 (not illustrated) is inserted into the respective compartment 19 of the grouping conveyor 18b.

The grouping conveyors 18a, 18b convey the respectively formed product groups perpendicularly to the conveying direction of the individual conveyors 17a, 17b, but in the same horizontal plane, in each case laterally to an ejection station 21a and 21b, respectively, from which said product groups by way of an assigned slide 29 (only the slide 29 assigned to the upper grouping conveyor 18a is illustrated in the drawings) are fed along the horizontal infeed tracks to a vertical conveyor 22.

The vertical conveyor 22 then feeds the product groups that have been supplied to the former in multiple tracks to the respectively offered-up container 11 in a single track.

For this purpose, said vertical conveyor 22 possesses inter alia a plurality of receptacles 23 into which the product groups that in each case emanate from the grouping conveyors 18a or 18b can be inserted.

The vertical conveyor 22 moves in each case the individual receptacles 23, or the product groups which are in each case contained therein, respectively, further upward to an ejection position 24 in which said product group by way of a slide 25, which is guided by a linear axle 26, is inserted along a horizontal, rectilinear conveying track into the container 11.

The vertical conveyor 22 is driven in a cycled manner and has a plurality of receptacles 23 which for in each case (at least one) product group are disposed on top of one another. The receptacles 23 can in each case be successively moved to a lower or an upper insertion position 30a or 30b, respectively, in which the respective receptacle 23 can be filled with the product group by the respective slide 29. The lower insertion position 30a herein is assigned to the lower grouping conveyor 18a, and the upper insertion position 30b is assigned to the upper grouping conveyor 18b, respectively.

The cyclic control of the vertical conveyor 22, or the control of the latter that is repeated in cycles, respectively, for optimizing the procedure is in terms of time or output, respectively, preferably takes place in such a manner that in a first operating cycle a receptacle 23 is moved from a position situated below the lower insertion station 30a to the lower insertion position 30a, a further receptacle 23 which is disposed thereabove is moved to an intermediate position between the lower insertion position 30a and the upper insertion position 30b (in which no receiving of product groups is possible), and a further receptacle 23 is moved from the intermediate position to the upper insertion position 30b.

Figure 2:
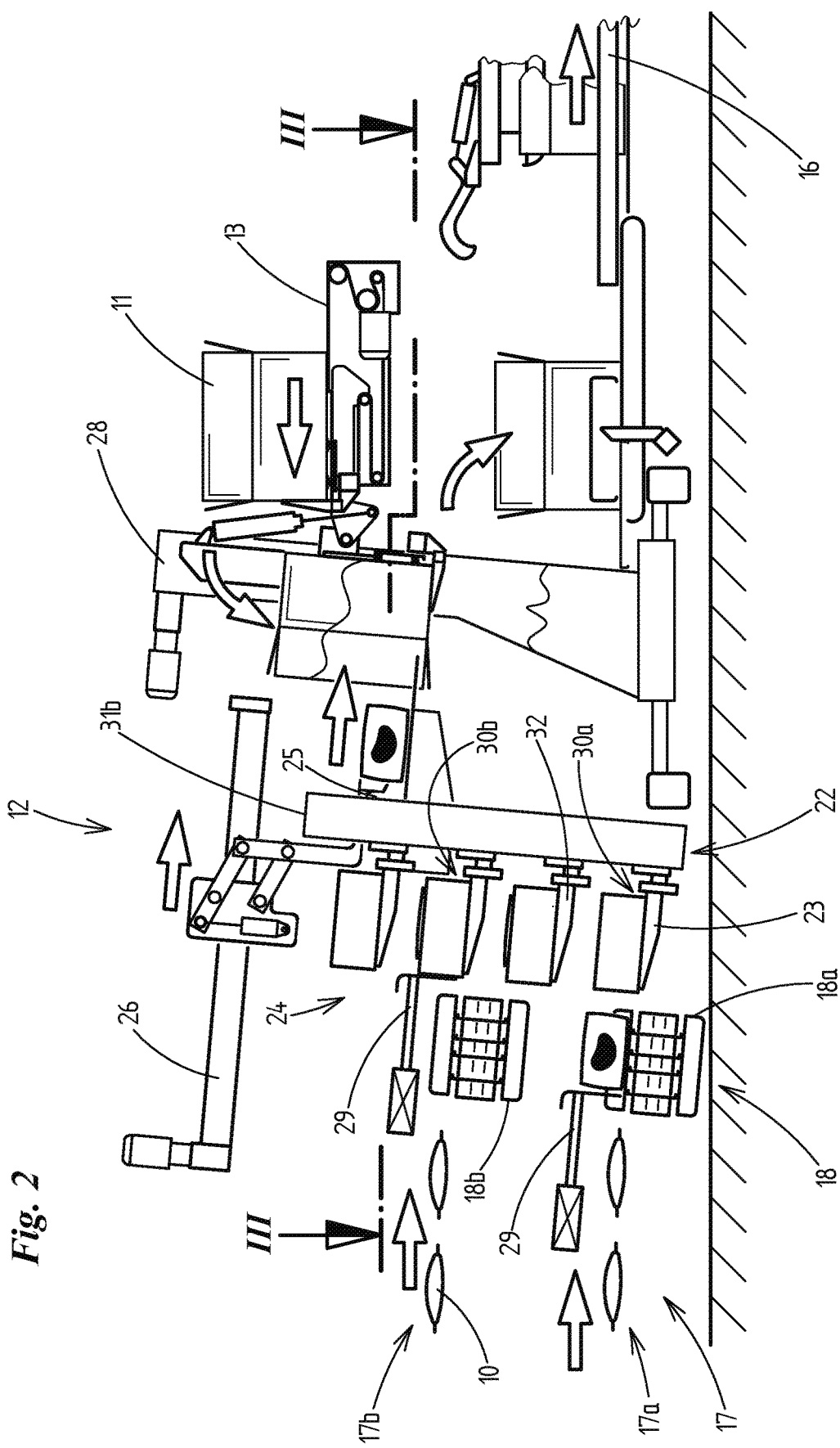
FIG. 2 shows the device from FIG. 1 in a lateral view corresponding to the viewing direction II in FIG. 1.
Figure 3:
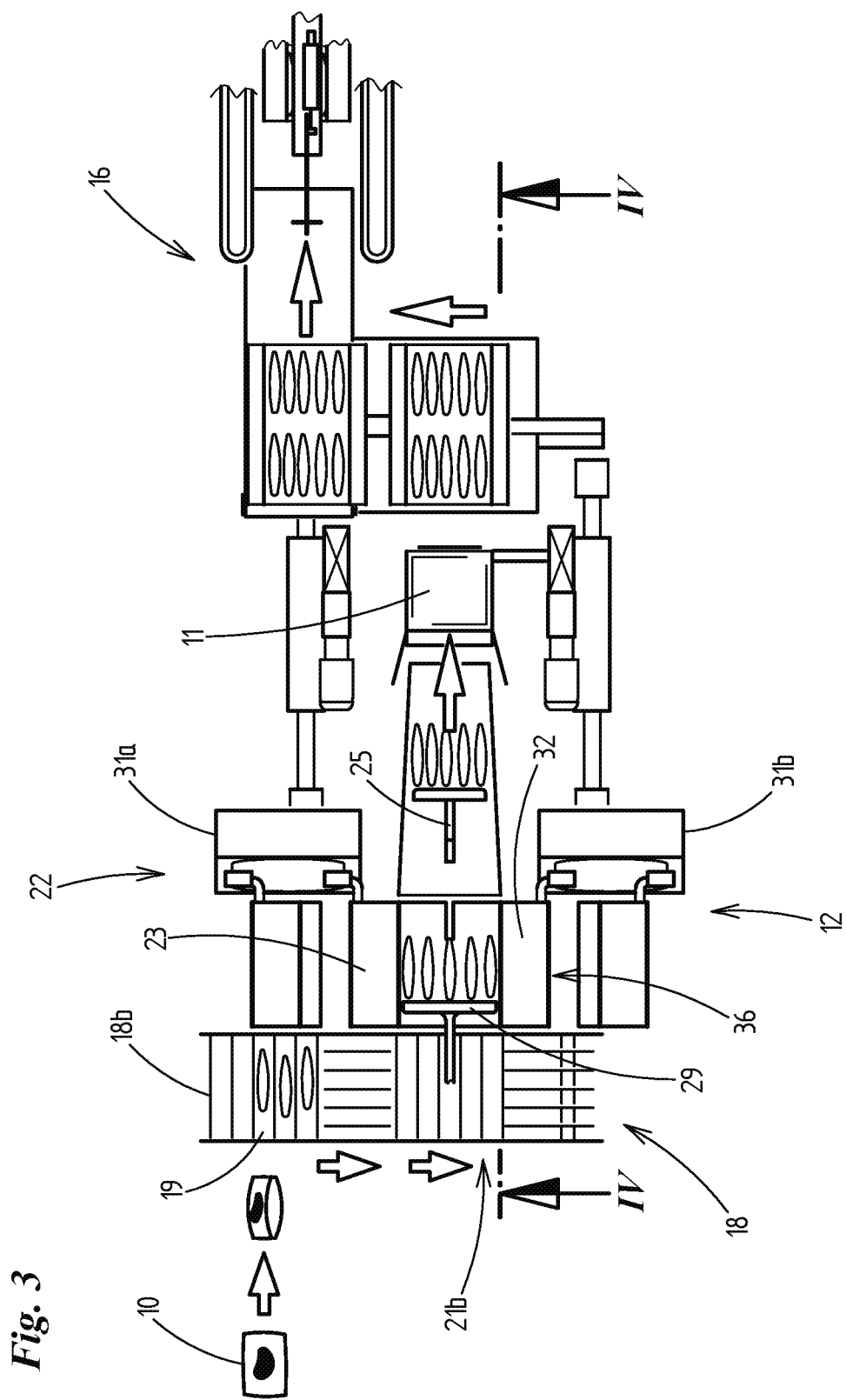
FIG. 3 shows a horizontal section through the device corresponding to the section line III-III in FIG. 2.
Figure 5:
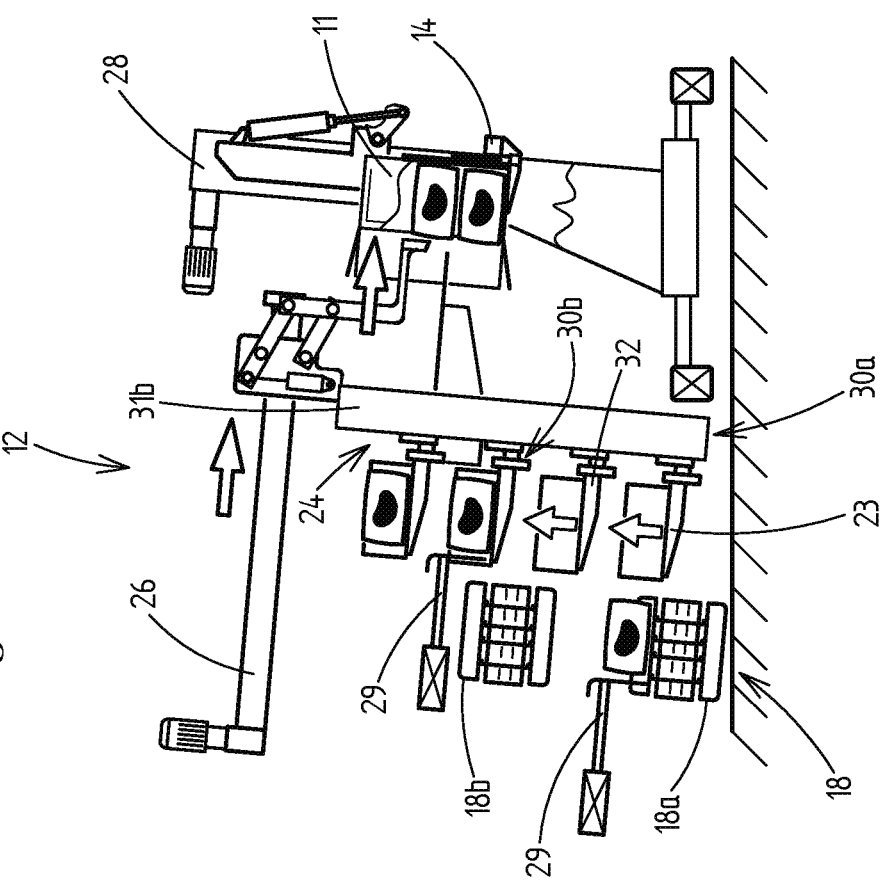
FIG. 5 shows an illustration analogous to that of FIG. 4, however in a later stage of filling.

In a second operating cycle a product group is then inserted into only one of the two receptacles 23 offered up in the respective insertion positions 30a and 30b, respectively. In the phase of movement of the second operating cycle shown in FIG. 2, a product group has just been inserted into the receptacle 23 situated in the upper insertion position 30b, for example. In this operating cycle herein, no product group is inserted into the receptacle 23 situated at the lower insertion position 30a. This remains accordingly empty. The receptacle 23 situated at the intermediate position has already been filled previously, in the operating cycle immediately before the first operating cycle.

In the next, third operating cycle all of the receptacles 23 are moved one step further upward, specifically the receptacle 23, which in the first operating cycle has been moved to the lower insertion position 30a, is moved to an intermediate position situated between the lower and the upper insertion position 30a and 30b, respectively; the receptacle 23, which in the first operating cycle has been moved to the intermediate position, is moved to the upper insertion position 30b; and a or the, respectively, receptacle 23, which in the first operating cycle has been moved to a position below the lower insertion position 30a, is moved to the lower insertion position 30a.

Figure 4:
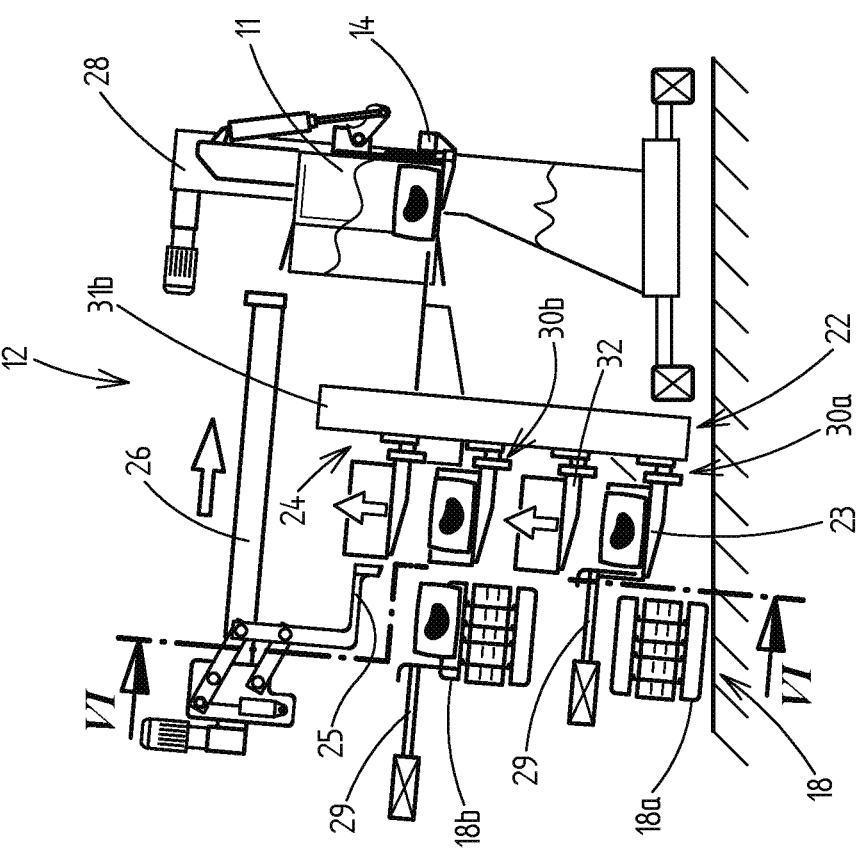
FIG. 4 shows a longitudinal section through the device according to the section line IV-IV from FIG. 3.
Figure 6:
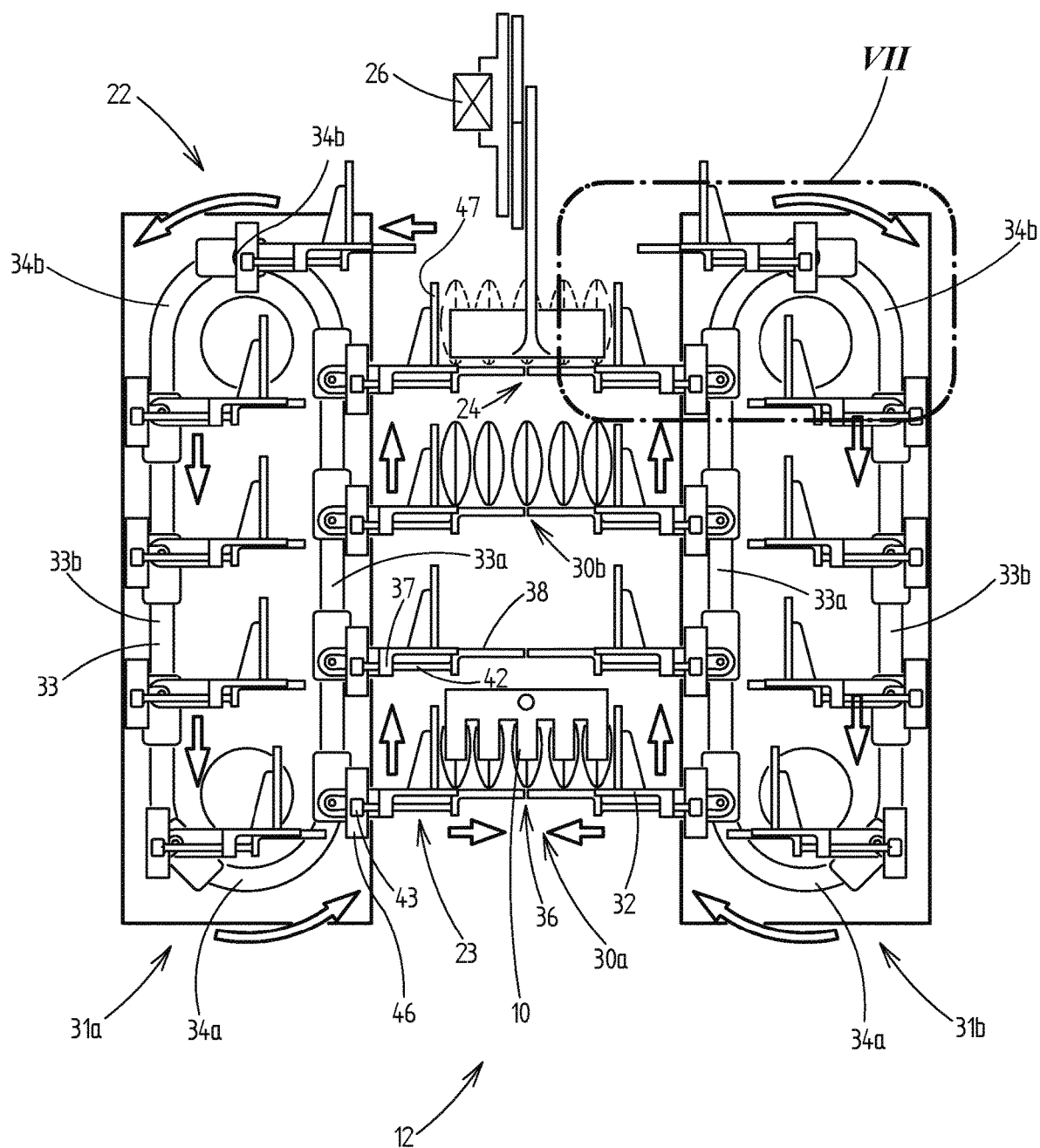
FIG. 6 shows a cross section of the device along the section line VI-VI from FIG. 4.
Figure 7:
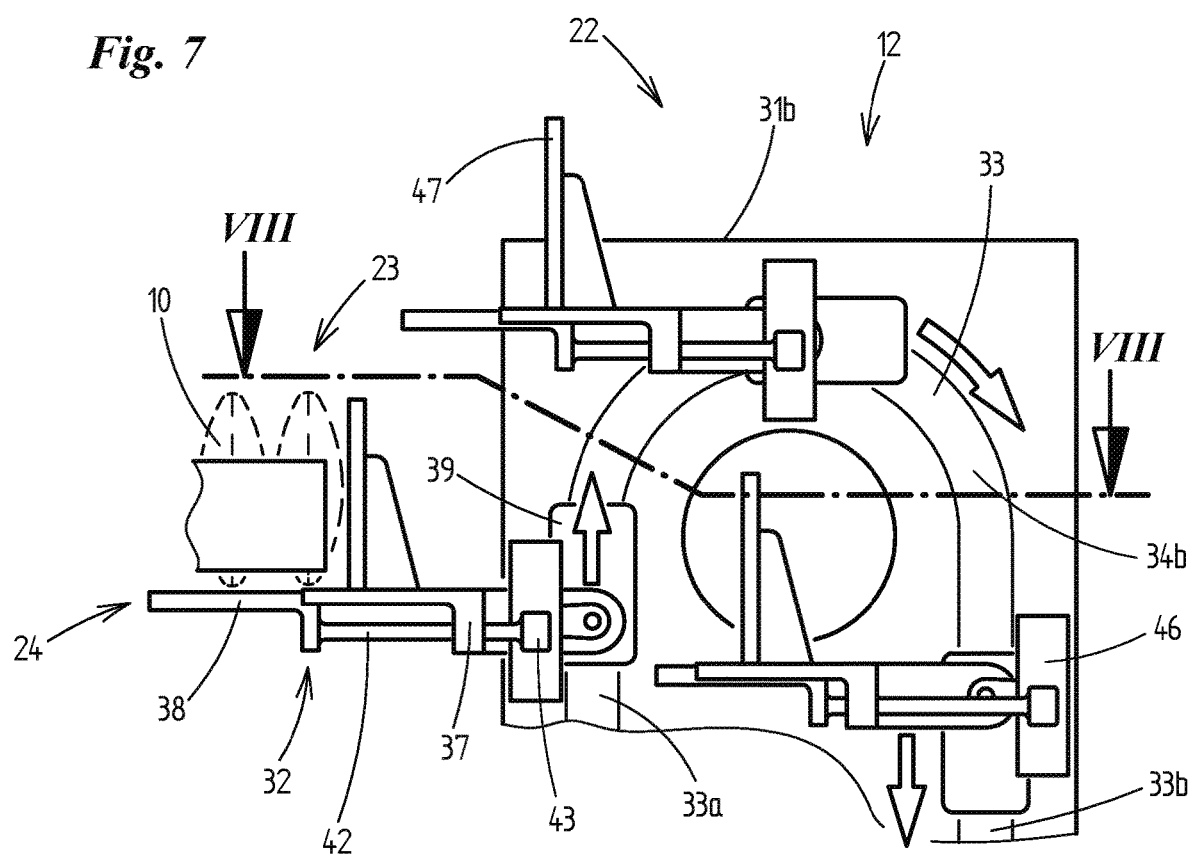
FIG. 7 shows the detail VII from FIG. 6 in an enlarged illustration.

In the immediately following fourth operating cycle, cf. FIG. 4, no product group is inserted into the receptacle 23 situated in the lower insertion position 30a because a product group is already situated therein.

In the immediately following fifth operating cycle the receptacle 23, which in the third operating cycle has been moved to the intermediate position, is moved to the upper insertion position 30b; the receptacle 23, which in the third operating cycle has been moved to the lower insertion position 30a, is moved to the intermediate position; and the receptacle 23, which in the third operating cycle has been moved to a position below the lower insertion position 30a, is moved to the lower insertion position 30a. In the sixth operating cycle, a product group is finally inserted into the receptacle 23 which then is situated in the upper insertion position 30b, while the receptacle 23 situated at the lower insertion position 30a remains empty.

Ultimately, a receptacle 23 for a product group is indeed offered up at each insertion position 30a, 30b in each operating cycle, but a receptacle 23 offered up at said insertion position 30a, 30b is however filled with a product group only in every third operating cycle.

In other words, at an insertion position 30a, 30b, a product group is in each case inserted into only every other of the receptacles 23 moved successively to said insertion position 30a, 30b.

In the further procedure, the receptacles 23 are then in each case successively moved in a cycled manner further upward to the ejection position 24 (which is common to all receptacles 23), and the respective product group of the receptacle 23 which is then situated there, cf. above, is ejected by means of the slide 25 and inserted along the horizontal, rectilinear conveying track into the offered-up container 11.

The design of the vertical conveyor 22 in terms of construction (likewise) represents a particularity. Said vertical conveyor 22 has two separate sub-conveyors, here specifically two slider apparatuses 31a, 31b in the manner of paternosters. Each slider apparatus 31a, 31b herein possesses a group of sliders 32 which are in each case guided along a closed oval movement track 33 which is disposed in an upright or a vertical, respectively, plane, said movement track 33 having in each case two rectilinear parallel track portions 33a and 33b, respectively, and in each case one lower and one upper, curved reversing track portion 34a and 34b, respectively.

It is understood that each slider apparatus 31a, 31b is operatively connected to a drive, in particular an electric motor, which ensures the movement of the sliders 32 along the movement track 33.

Two sliders 32 of the two slider apparatuses 31a, 31b during a simultaneous upward movement are in each case moved in a synchronized manner along the respective track portion 31a, while forming in each case one slider pair 36, such that said two sliders 32 in this upward movement lie opposite one another in a common (moving) horizontal plane, or are mutually aligned, respectively, and conjointly form in each case one of the receptacles 23 of the vertical conveyor 22.

The sliders 32 of a slider pair 36, or all sliders 32, respectively, herein possess in each case one stationary part 37 as well as a slider platform 38 which in a telescopic manner is displaceable relative to the stationary part 37, wherein said slider platform 38, preferably conjointly with the stationary part 37, form the base of the respective receptacle 23 formed by the slider pair 36.

Each of the sliders 32, in particular the stationary part 37, furthermore has a lateral support wall 47 which, conjointly with a, or the corresponding, respectively, support wall 47 of the other slider 32 of a slider pair of 36 forms upright lateral walls of the receptacle 32 formed by the pair 36.

The design of each slider apparatus 31a, 31b in terms of construction herein is selected in such a manner that the slider platform 38 of each slider 32 of each slider pair 36, in each case before the sliders 32 of the pair 36, while forming the respective receptacle 32, are moved to the lower insertion position 30a, is moved relative to the stationary part 37 from a retracted position in which the respective slider 32 transversely to the movement track 33 thereof is shorter, to a deployed position in which the slider 32 transversely to the movement track 33 thereof is longer, and in which free ends of the two sliders 32 or of the platforms 38 of the mutually aligned sliders 32 of the slider pair 36 that are directed toward one another are directly opposite one another, wherein the sliders 32 in this position are in each case moved in an upward movement from the bottom to the top.

Figure 9:
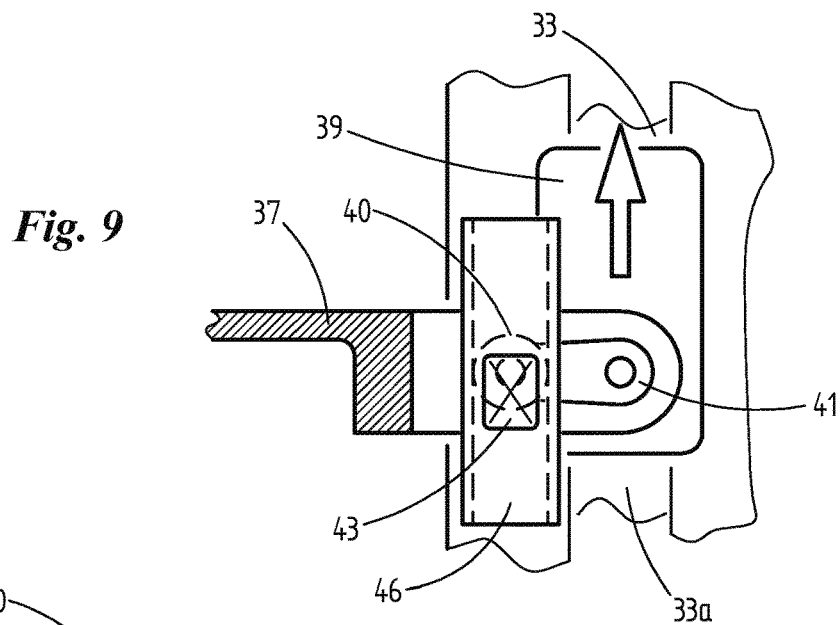
FIG. 9 shows a section through the device according to the section line IX-IX in FIG. 8.
Figure 10:
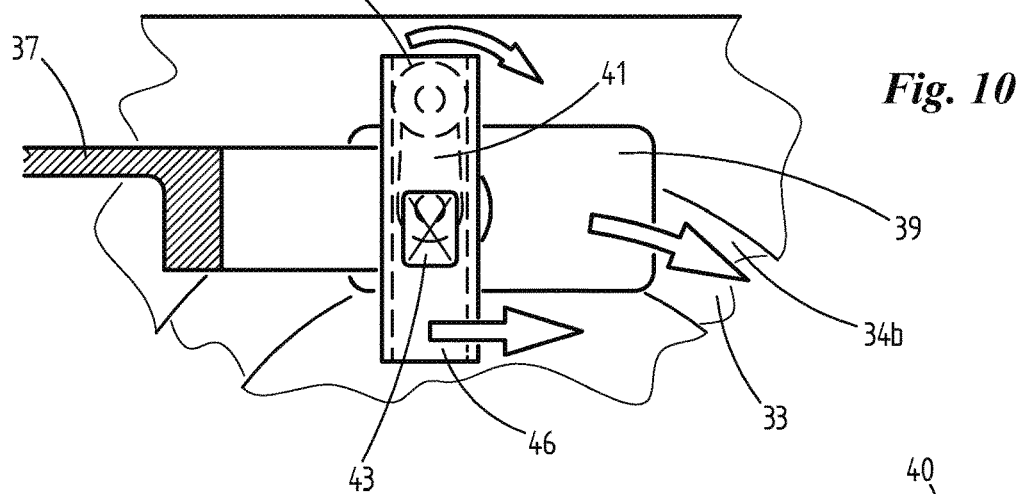
FIG. 10 shows an illustration corresponding to that of FIG. 9, in a later operating stage of the device.
Figure 11:
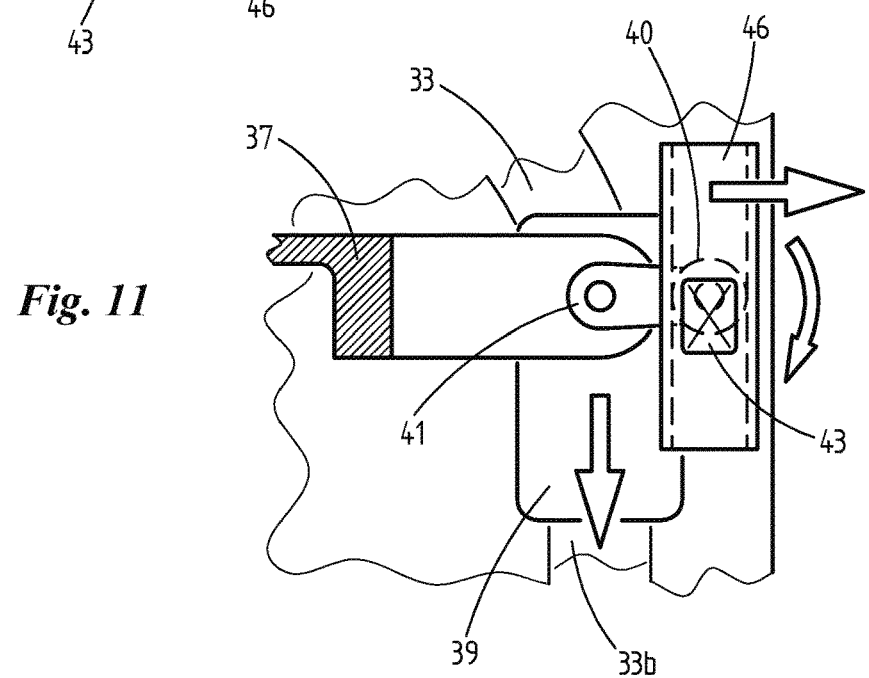
FIG. 11 shows an illustration corresponding to that of FIG. 10 in an even later operating stage of the device.
Figure 12:
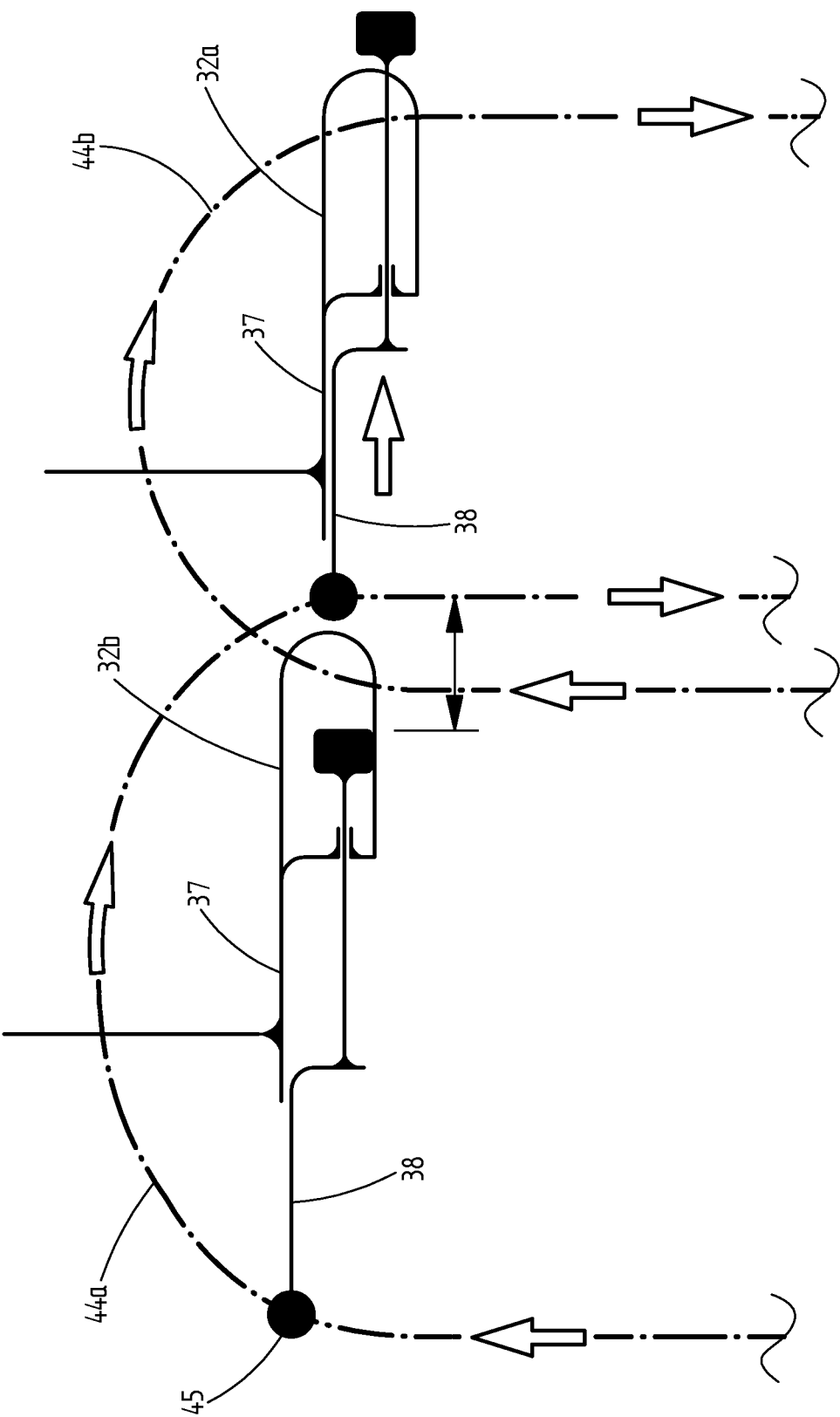
FIG. 12 shows a simplified illustration of the movements of the slider of a vertical conveyor of the device.

To this end, the slider platform 38 of each slider 32 that is able to be deployed in a telescopic manner is mounted so as to be movable on a carriage 39 of the slider 32 which is guided along the movement track 33. This presently takes place by way of a movable roller 40 which by way of the crank 41 is fixedly connected to the carriage 39. This specifically takes place in such a manner that the slider platform 38 in a movement of the carriage 39 in the upright track portion 33a in which the respective carriage 39, or the slider 32, respectively, is moved from the bottom to the top, cf. FIG. 9 and FIG. 12, is in each case in the deployed state, and in a movement of the carriage 39 in the parallel upright track portion 33b of the movement track 33 in which the carriage 39 or the slider 32, respectively, is moved from the top to the bottom, cf, FIG. 11, is in the retracted state.

The transition from the deployed state to the retracted state herein takes place in the upper curved reversing track portion 34a of the movement track 33 that is situated between the two upright track portions 33a, 33b, and the transition counter thereto from the retracted state into the deployed state takes place in the lower, curved reversing track portion 34*b* which is situated between the two upright track portions 33*a*, 33*b*.

Figure 8:
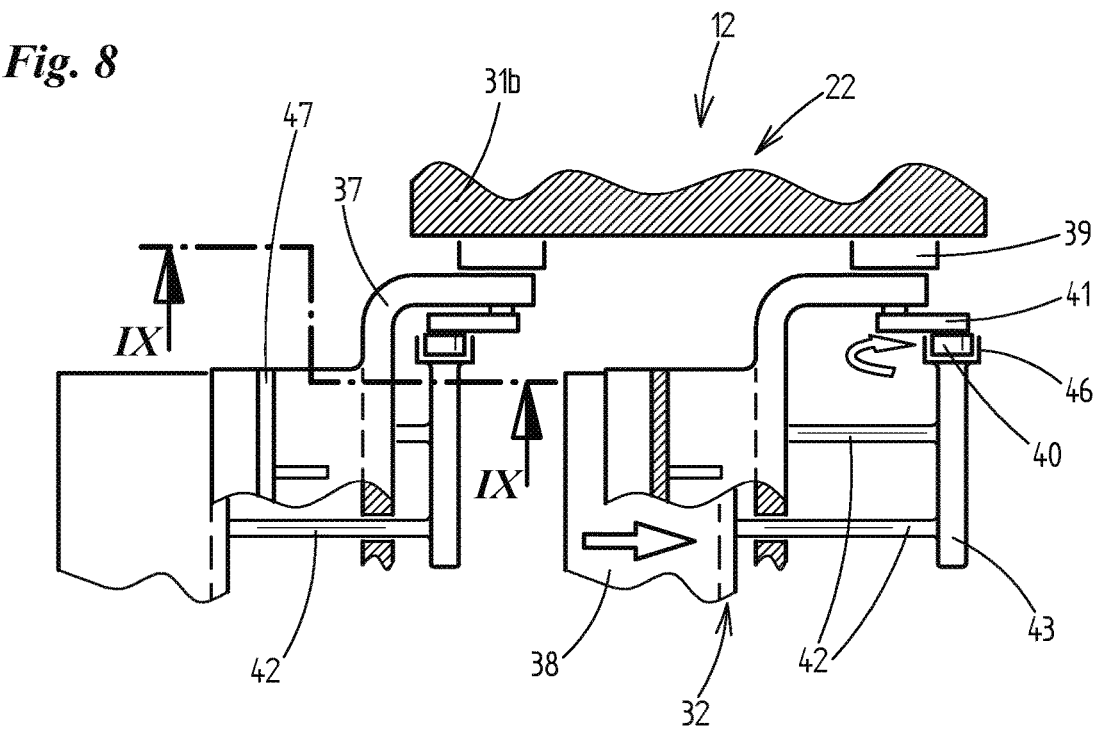
FIG. 8 shows a section through the device according to the section line VIII-VIII from FIG. 7.

Specifically, an elongate crossbeam 43 which is fixedly connected to the slider platform 38 by way of one or a plurality of elongate guide rods 42 and is directed perpendicularly to the plane of the movement track 33 is mounted so as to be rotatable on the roller 40, the latter being rotatably mounted on the crank 41, in that a U-shaped guide part of the crossbeam 43 that is adapted to the external contour of the roller 40 laterally encompasses the roller 40, cf. FIG. 8.

The guide rods 42 extend parallel to the plane of the movement track 33 and so as to be spaced apart thereto, and are mounted so as to be longitudinally displaceable on the stationary part 37 (which is likewise rotatably mounted on the carriage 39).

The afore-mentioned mounting has the effect that the crossbeam 43, which in a movement of the carriage 39 within the movement track 33*a* is disposed to the left of the carriage 39, in a movement of the carriage 39 along the upper reversing track portion 34*b* is pivoted, or changes its relative position, respectively, such that said crossbeam 43, in a movement of the carriage 39 along the movement track 33*b*, is subsequently pivoted to the right relative to the carriage 39. Accordingly, the slider platform 38 which by way of the guide rods 42 is mounted so as to be movable on the stationary part 37 moves relative to said stationary part 37, from the deployed position to the retracted position.

These procedures take place in the reverse order in the later movement of the slider 32 along the lower reversing track portion 34*a*.

As is schematically illustrated in FIG. 12, this also leads to a trailing slider 32*b* of a slider apparatus 31*a*, 31*b* that is in a deployed state and guided along the track portion 33*a*, on the path of said slider 32*b* toward the top, not colliding with a leading slider 32*a* which is already moved downward in the track portion 33*b*, because said leading slider 32*a* is already in the retracted state. In order for these correlations to be visualized in FIG. 12, the dash-dotted movement track of the external interference contour 45 of the movable slider platform 38 of the following slider 32*b* is identified by the reference sign 44*a*, and the movement track of the carriage 39 of the leading slider 32*b* is identified by the reference sign 44*b*. Accordingly, the oval of the movement track 33 of each slider apparatus 31*a*, 31*b* can be conceived so as to be very compact.

LIST OF REFERENCE SIGNS

10 Product
11 Container
12 Filling installation
13 Infeed conveyor
14 Gripper
16 Outfeed conveyor
17 Horizontal conveying apparatus
17*a* Individual conveyor
17*b* Individual conveyor
18 Grouping apparatus
18*a* Grouping conveyor
18*b* Grouping conveyor
19 Compartment
20 Slide
21*a* Ejection station
21*b* Ejection station
22 Vertical conveyor
23 Receptacle
24 Ejection position
25 Slide
26 Linear axle
27 Linear axle
28 Linear axle
29 Slide
30*a* Insertion position
30*b* Insertion position
31*a* Slider apparatus
31*b* Slider apparatus
32 Slider
32*a* Leading slider
32*b* Trailing slider
33 Movement track
33*a* Rectilinear track portion
33*b* Rectilinear track portion
34*a* Reversing track portion
34*b* Reversing track portion
36 Pair of slides
37 Stationary part
38 Slider platform
39 Carriage
40 Roller
41 Crank
42 Guide rods
43 Crossbeam
44*a* Movement track interference contour
44*b* Movement track carriage
45 Interference contour
46 U-shaped guide
47 Support wall

The invention claimed is:

1. A method for filling containers with products (10) in which the products (10) are successively conveyed horizontally to a filling installation (12) in which the products (10), while being combined so as to form individual product groups, thereafter are grouped, and an offered-up container (11), which is conveyed to the filling installation (12), is filled in a single track with one or a plurality of product groups, wherein the offered up containers (11) that are filled subsequently are transported away, comprising the steps of:
   a) conveying the products (10) in multiple tracks to the filling installation (12) along a plurality of conveying tracks which are disposed on top of one another;
   b) grouping the products (10) conveyed along the conveying tracks to the filling installation (12) by the filling installation (12) in multiple tracks so as to form product groups by grouping conveyors of the filling installation (12) that are assigned to the conveying tracks and disposed on top of one another;
   c) successively feeding the product groups thereafter in multiple tracks along infeed tracks that are disposed on top of one another to a common revolving vertical conveyor (22) of the filling installation (12), the common revolving vertical conveyor (22) having a plurality of receptacles (23) which for at least one product group of each infeed track are disposed on top of one another;
   d) the common revolving vertical conveyor (22) conveying the product groups received by the common revolving vertical conveyor (22) from further below to further above to an ejection position from which the product groups thereafter are conveyed onward in a single track in the direction of the offered-up container (11); and
   e) filling the offered-up container (11) with at least one of the product groups.

2. The method as claimed in claim 1, wherein in a first operating cycle a first set of the receptacles (23) of the common revolving vertical conveyor (22) is moved simultaneously further upward to insertion positions which are assigned to the infeed tracks and are disposed so as to be level with one of the infeed tracks; in that each of the receptacles (23) in a respective insertion position thereof is offered up for receiving one product group of the infeed track; in that immediately thereafter in a second operating cycle at least one product group of at least one infeed track is inserted into a respective one of the receptacles (23) that is offered up for receiving the one product group; and in that in an immediately following third operating cycle a second set of the receptacles (23) is moved simultaneously further upward to the insertions positions.

3. The method as claimed in claim 1, wherein in the case of the filling installation (12) comprising only two infeed tracks, specifically a lower and an upper infeed track, the lower infeed track is assigned a lower insertion position which is disposed so as to be level with said lower infeed track, and the upper infeed track is assigned an upper insertion position which is disposed so as to be level with said upper infeed track; in that one of the receptacles (23) is moved successively in a cycled manner into each insertion position; in that each of the receptacles (23) situated in the respective insertion position is offered up for receiving a product group of the assigned infeed track; and in that it applies to each of these insertion positions that one product group is inserted only into every other of the receptacles (23) successively moved to said insertion position.

4. The method as claimed in claim 3, wherein in a first operating cycle the first set of the receptacles (23) of the common revolving vertical conveyor (22) is moved simultaneously further upward to the insertion positions which are assigned to the two infeed tracks, wherein each of the receptacles (23) in the respective insertion position thereof is offered up for receiving one product group of the assigned infeed track; and in that one product group is successively inserted in a cycled and alternating manner into the receptacle (23) that is situated in the one insertion position, while in the same operating cycle no product group is simultaneously inserted into the receptacle (23) that is situated in the other insertion position.

5. The method as claimed in claim 4, wherein in an immediately following second operating cycle the product group is inserted into only one the receptacles (23) offered up in the upper insertion position, while the receptacle (23) offered up in the lower insertion position remains empty.

6. The method as claimed in claim 5, wherein in an immediately following third operating cycle the receptacle (23) which in the first operating cycle has been moved to the lower insertion position is moved to an intermediate position situated between the lower and the upper insertion position, a receptacle (23) which in the first operating cycle has been moved to the intermediate position is moved to the upper insertion position, and a receptacle (23) which in the first operating cycle has been moved to a position below the lower insertion position is moved to the lower insertion position; and in that in an immediately following fourth operating cycle a product group is inserted into the receptacle (23) situated in the lower insertion position while no product group is inserted into the receptacle (23) situated in the upper insertion position.

7. The method as claimed in claim 6, wherein in an immediately following fifth operating cycle the receptacle (23) which in the immediately following third operating cycle has been moved to the intermediate position is moved to the upper insertion position, the receptacle (23) which in the third operating cycle has been moved to the lower position is moved to the intermediate position, and a receptacle (23) which in the third operating cycle has been moved to a position below the lower insertion position is moved to the lower insertion position; and in that in an immediately following sixth operating cycle a product group is inserted into the receptacle (23) situated in the upper insertion position, while the receptacle (23) situated at the lower insertion position remains empty.

8. The method as claimed in claim 1, wherein in each operating cycle one receptacle (23) for one product group is offered up at each insertion position, wherein in terms of a respective insertion position only one product group is inserted into a respective receptacle (23) offered up there.

9. The method as claimed in claim 1, wherein the receptacles (23) are successively moved in a cycled manner to the ejection position; and in that the product group which is situated in the receptacle (23) situated at the ejection position by means of a slide is ejected from the receptacle (23) and along a horizontal conveying plane is inserted into the offered-up container (11).

10. The method as claimed in claim 1, wherein the common revolving vertical conveyor (22) possesses two separate groups of sliders (32) which are guided in a continuously revolving manner in a common upright plane and herein in portions along parallel upright track portions, wherein two respective opposite sliders (32) of the two slider groups during a simultaneous upward movement are moved along the parallel track portions in a synchronized manner such that the two opposite sliders (32) herein lie in a common moving horizontal plane, or are mutually aligned, respectively, and conjointly form one of the receptacles (23) of the common revolving vertical conveyor (22).

11. The method as claimed in claim 10, wherein the sliders (32) of the one slider group form with one slider (32) of the other slider group one pair for forming the receptacles (23), wherein the sliders (32) possess one slider platform (38), wherein the slider platform (38) of each slider (32) of each pair of sliders, before the sliders (32) are moved to a lower insertion position, is moved relative to a stationary part (37) of the respective slider (32), from a retracted position in which a respective slider (32) transversely to the movement track thereof is shorter, to a deployed position in which the slider (32) transversely to the movement track thereof is longer, and in which free ends of the two slider platforms (38) of mutually aligned sliders (32) of the pair of sliders are directed toward one another and directly opposite one another, and in this position are moved in an upward movement from the bottom to the top.

12. The method as claimed in claim 11, wherein the slider platforms (38) of the sliders (32) of the pair of sliders are moved from the deployed position to the retracted position once the respective group of packs, which has been situated in the receptacle (23) formed by the sliders (32), in the ejection position of the receptacle (23) has been conveyed out of the latter receptacle (23) in the direction of the offered up container (11), wherein thereafter the sliders (32) of the pair of sliders in a respective downward movement, following a respective upward movement of the sliders (32), are moved downward with a retracted slider platform (38).

13. The method as claimed in claim 1, wherein the products (10) are successively inserted by the conveying tracks that are disposed on top of one another into individual compartments of the grouping conveyors that are configured as compartmentalized conveyors, thereafter the products (10) are conveyed in groups by the grouping conveyors in a direction that is transverse to the direction of the conveying tracks, and thereafter from the compartments inserted in groups, transversely to a conveying direction of the grouping conveyors, along the infeed tracks into the receptacles (23) of the common revolving vertical conveyor (22) which are situated at assigned insertion positions.

14. A device for filling containers with products (10), having a horizontal conveyor (17) for horizontally feeding the products (10) to a filling installation (12) of the device in which the products (10), while being combined so as to form individual product groups, thereafter are grouped and filled into an offered-up container (11), wherein:
- the filling installation (12) has a multi-track grouping apparatus (18) having a plurality of grouping conveyors which are disposed on top of one another and by way of which the products (10) are grouped so as to form product groups;
- the horizontal conveyor (17) is configured as a multi-track horizontal conveyor apparatus which is disposed upstream of the grouping apparatus (18) and has a plurality of individual conveyors which are disposed on top of one another and which feed the products (10) horizontally to one of the grouping conveyors assigned to the respective individual conveyor; and
- the filling installation (12) downstream of the grouping apparatus (18) has a single-track vertical conveyor (22) which has a plurality of receptacles (23) which for at least one product group are disposed on top of one another, the product groups that have been grouped by the grouping apparatus (18) being able to be fed in multiple tracks along a plurality of infeed tracks which are disposed on top of one another to the receptacles of the single track vertical conveyor (22).

15. The device as claimed in claim 14, wherein the single track vertical conveyor (22) has two separate sub-conveyors having groups of sliders (32) which are guided in a revolving manner along a movement track in a common upright plane and herein in portions along parallel upright movement track portions, wherein during a simultaneous upward movement opposite sliders (32) of the two slider groups of the sub-conveyors form one pair for forming one of the receptacles (23) of the single track vertical conveyor (22).

16. The device as claimed in claim 15, wherein respectively two sliders (32) are movable in a synchronized manner along the parallel upright movement track portions such that the two sliders (32) herein are mutually aligned in a moving horizontal plane and conjointly form one of the receptacles (23) of the single track vertical conveyor (22).

17. The device as claimed in claim 16, wherein the extent of the sliders (32) transversely to the movement track thereof is variable by a slider platform (38) which is able to be retracted or deployed, respectively, in a telescopic manner relative to a stationary part (37) of the slider (32), and is mounted so as to be displaceable on the stationary part (37).

18. The device as claimed in claim 17, wherein the slider platform (32) of each slider (32) that is able to be deployed in a telescopic manner is mounted so as to be rotatable on a carriage of the slider (32) that is guided along the movement track.

19. The device as claimed in claim 18, wherein the slider (32), and a rotatable mounting of the slider platform (38) of the carriage, are configured in such a manner that the slider platform (38), in an upright track portion in which the carriage or the slider (32), respectively, is moved upwardly, is in a deployed state and, in a parallel upright track portion of the movement track in which the carriage or the slider (32), respectively, is moved downwardly, is in a retracted state, wherein a transition between the deployed state and the retracted state takes place in an upper curved reversing track portion of the movement track that is situated between the parallel upright movement track portions, and a transition counter thereto takes place in a lower curved reversing track portion that is situated between the parallel upright movement track portions.

20. The device as claimed in claim 17, wherein the stationary part (37) of each slider (32) has a lateral support wall which, conjointly with a corresponding support wall of the other slider (32) of a slider pair form parallel upright lateral walls of the receptacle (23) of the single track vertical conveyor (22) that are formed by the slider pair.

21. The device as claimed in claim 14, wherein the grouping conveyors are continuous compartmentalized conveyors having compartments for at least one product.

22. The device as claimed in claim 14, for carrying out a method for filling the containers with the products, in which the products (10) are successively conveyed horizontally to the filling installation (12) in which the products (10), while being combined so as to form the individual product groups, thereafter are grouped, and the offered-up container (11), which is conveyed to the filling installation (12), is filled in a single track with one or a plurality of the individual product groups, wherein the offered up containers (11) that are filled subsequently are transported away, comprising the steps of:
- a) conveying the products (10) in multiple tracks to the filling installation (12), specifically along a plurality of conveying tracks which are disposed on top of one another;
- b) grouping the products (10) conveyed along the conveying tracks to the filling installation (12) by the filling installation (12) in multiple tracks so as to form the individual product groups;
- c) successively feeding the product groups thereafter in the multiple tracks along the infeed tracks that are disposed on top of one another to the single track vertical conveyor (22) of the filling installation (12), the single track vertical conveyor (22) having the plurality of receptacles (23) which for at least one product group of each infeed track are disposed on top of one another;
- d) the single track vertical conveyor (22) conveying the product groups received by the single track vertical conveyor (22) from further below to further above to an ejection position from which the product groups thereafter are conveyed onward in a single track in the direction of the offered-up container (11); and
- e) filling the offered-up container (11) with at least one of the product groups.

* * * * *